UNITED STATES PATENT OFFICE.

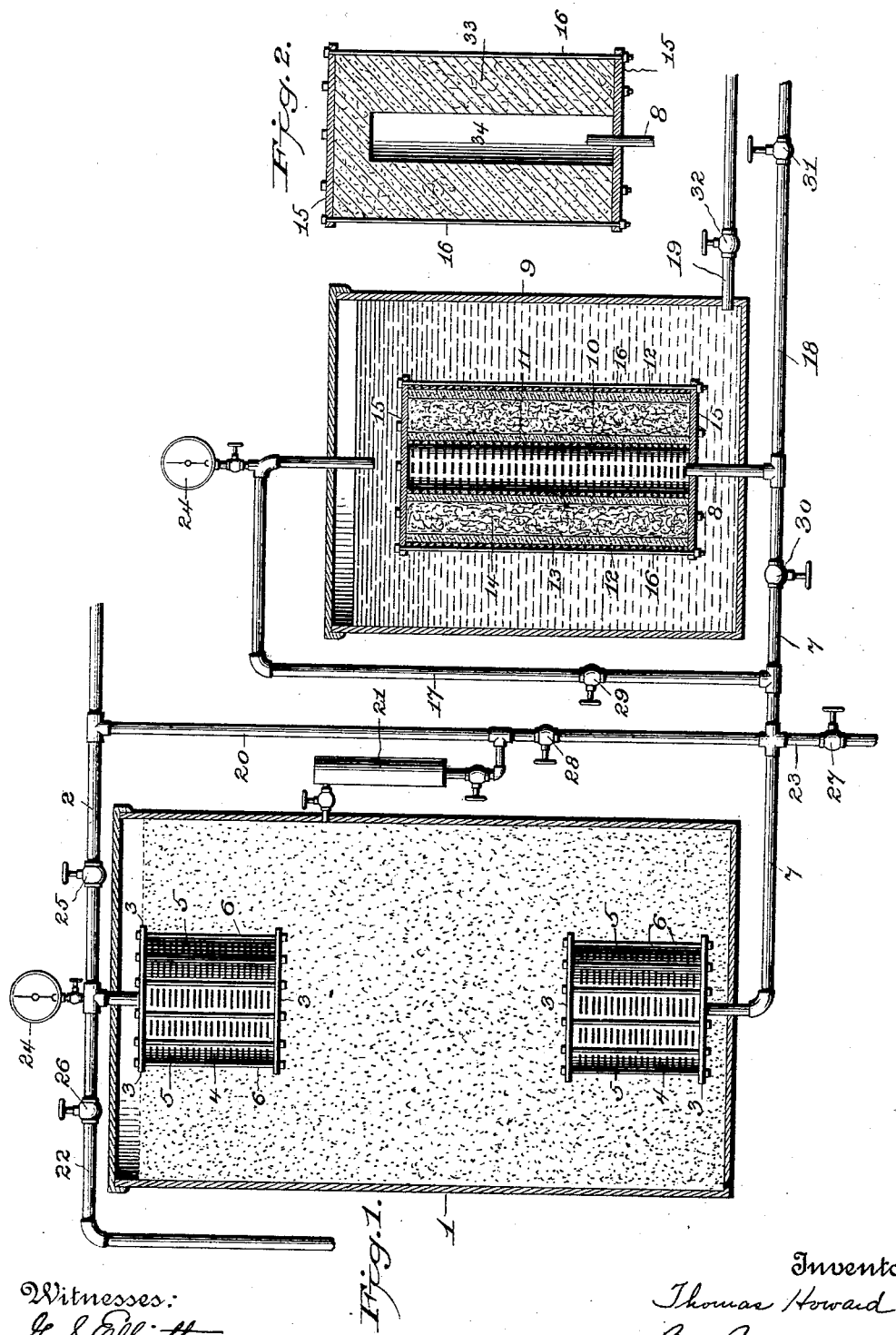

THOMAS HOWARD, OF ASHLAND, KENTUCKY.

FILTER.

SPECIFICATION forming part of Letters Patent No. 632,570, dated September 5, 1899.

Application filed May 24, 1899. Serial No. 718,036. (No model.)

*To all whom it may concern:*

Be it known that I, THOMAS HOWARD, a citizen of the United States, residing in Ashland, in the county of Boyd, State of Kentucky, have invented certain new and useful Improvements in Filters, of which the following is a specification.

My invention relates to filters, and has for its object, primarily, to provide certain improvements in the construction of the same, whereby the liquid to be filtered may be subjected to the combined action of a granular bed and a porous wall, the arrangement being such, however, that either one of said filtering media may be readily thrown out of action when so desired and the liquid subjected to the action of the other filtering medium alone.

Certain novel minor details of construction are also disclosed in my invention, as will be hereinafter specifically set forth.

In the accompanying drawings, Figure 1 illustrates a vertical sectional view of a combined granular-bed and porous-wall filter embodying my improvements. Fig. 1 is a detail sectional view of a modified form of porous wall.

In the said drawings the reference-numeral 1 denotes a chamber for containing the granular filtering medium, as shown, the same consisting, preferably, of sand, charcoal, magnesite, or other suitable filtering material. Leading into the upper end of said chamber is an inlet-pipe 2 for the liquid, the same terminating within and supporting a strainer composed of upper and lower imperforate plates 3, closing the open ends of a cylinder 4, that is provided with a plurality of horizontal narrow kerfs or slots 5, as shown, the latter being wide enough to permit the passage of the liquid therethrough, but not wide enough to permit the passage of the material composing the granular bed. The edges of the plates 3 project sufficiently beyond the outer surface of the cylinder 4 to permit the engagement therewith of a series of longitudinal stay-rods 6, which contact throughout their length with the exterior surface of said cylinder and serve to hold the parts firmly together.

In the bottom of chamber 1 is located another strainer, constructed similar in every respect to the one in the upper part of said chamber and supported by a pipe 7, tapped through the bottom of chamber 1 and extending therefrom to a pipe 8, that enters the bottom of a smaller chamber 9 and passes up into the hollow center of a porous-wall filter, consisting, preferably, of an inner perforated tube or cylinder 10, around the exterior of which is wrapped a covering 11 of any suitable filtering material—such as pasteboard, filtering-paper, felt, or blotting-paper—an outer perforated tube or cylinder 12, on the interior surface of which is located a lining 13, similar in material to covering 11, and an intermediate filling 14 of granular substance—such as asbestos, magnesite, gravel, or charcoal—the latter not only acting as an auxiliary filtering medium, but also serving to retain the covering 11 and lining 13 in position. Upper and lower imperforate plates 15, overlapping the outer cylinder 12 and through which are bolted longitudinal stay-rods 16, serve to retain said parts firmly together, the said stay-rods by contacting with the outer cylinder 12 throughout their length also serving to prevent the bulging of the latter when subjected to an internal liquid-pressure.

Extending from pipe 7 intermediate its length is a pipe 17, that enters the top of chamber 9 and terminates above the porous-wall filter, while extending from the juncture of pipes 7 and 8 is a pipe 18, intended, primarily, to carry off the filtered liquid. An additional pipe 19 is tapped into the lower side of chamber 9 for a purpose hereinafter to be explained.

Connecting supply-pipe 2 and pipe 7, intermediate chamber 1 and pipe 17, is a pipe 20, between which and chamber 1 may, if desired, be located an alum-pot 21 of the usual construction. A pipe 22, tapped into pipe 2 before it enters chamber 1, serves as a wash-out for chamber 1, while an additional pipe 23, tapped into pipe 7 intermediate its length, serves to carry off the liquid after it has passed through chamber 1 when it is not desired to use the chamber 9.

Suitable gages 24 may be located on top of chambers 1 and 9 to indicate the liquid-pressure therein.

Stop-cocks 25, 26, 27, 28, 29, 30, 31, and 32 are provided in the various pipes, as shown, by which to control the various operations of the device, as will now be described.

When it is desired to filter through both chambers, stop-cocks 25, 29, and 31 are opened and the others closed, whereupon the liquid will pass from supply-pipe 2 into chamber 1, through the upper strainer therein, thence through the granular filter-bed and lower strainer into pipe 7, thence through pipe 17 into chamber 9, where it will percolate through the porus-wall filter and be carried off through pipes 8 and 18 thoroughly filtered from having been subjected first to the action of the granular bed, which arrests the larger impurities, and then to the action of the porous-wall filter, which arrests the finer impurities and restores to the liquid its pure color. When the liquid needs but little filtering, such as may be provided by the granular bed alone, stop-cock 29 is closed and 27 opened, whereupon the liquid will pass out through pipe 23, the volume thereof being limited only by the sizes of supply-pipe 2 and pipe 23.

To cleanse the granular bed, stop-cocks 25, 27, 29, and 30 are closed and 26 and 28 opened, whereupon the liquid will flow from pipe 2, through pipes 20 and 7, into the lower end of chamber 1 and out through pipe 22, thus reversing the current and removing the impurities deposited in the granular bed. To cleanse the porous-wall filter, stop-cocks 29 and 31 are closed and 30 and 32 opened, whereby the current in chamber 9 is reversed, the liquid passing through pipes 7 and 8 into the interior chamber of said porous-wall filter and then through said filter and out through pipe 19, removing all impurities deposited on the exterior of said filter. It will be observed that this reversal may be effected at predetermined intervals during a continuous filtering process, whereby the liquid will alternately pass from the exterior inward through filter and from the interior outward therethrough, and said filter will be thereby subjected to frequent cleansings.

I have illustrated in Fig. 2 a modified form of porous-wall filter to be used in chamber 9, the same consisting of a solid filter-stone 33, of any suitable material, having an interior chamber 34, into which the pipe 8 is tapped, as shown. Said stone is also provided with the upper and lower plates 15, united and retained by the stay-rods 16, the same serving to prevent the fracture of said stone under pressure. If desired, a plurality of filtering-stones 33 may be located in chamber 9, each having its interior connected with the pipe 8, that connects with pipes 7 and 18, the filtering capacity of chamber 9 being thereby materially increased without in any way affecting the mode of operation.

The use of the plates 15 and stay-rods 16 on the porous-wall filter and stone 33 has been found in practice to be of the highest value in retaining the parts of the former together and in preventing fracture of said stone under the liquid-pressure, it being observed that said stay-rods contact with cylinder 12 and with said stone throughout their length, thereby exerting a binding force thereon. Also the particular form of strainers described and illustrated in chamber 1 have not only proved to be highly efficient, but also may be readily taken apart to replace the cylinders 4 or to thoroughly cleanse the same. It will be observed also that the stay-rods 6 also lie in contact with the cylinders 4 throughout their length, said stay-rods 6 thus acting as binding-braces for said cylinders as well as retaining the parts together.

Having thus described my invention, what I claim as new, and desire to secure by Letters Patent, is—

1. In a filter, the combination of a chamber containing a granular filtering medium, ingress and egress pipes thereto, strainers mounted on the open inner ends of said pipes consisting each of a cylinder having a plurality of kerfs or slots in its area for the passage of the liquid, imperforate plates closing the ends of said cylinders and overlapping the same, and stay-rods connecting said plates exterior to said cylinder for detachably retaining the parts together, a second and separate chamber containing a porous-wall filtering medium, and pipe connections leading to, uniting, and leading from said chambers, whereby the liquid to be filtered will be passed successively through said chambers, substantially as set forth.

2. In a filter, the combination with a chamber containing a granular filtering medium, of a second and separate chamber, a porous-wall filtering medium therein, upper and lower imperforate plates lying on the ends of said filtering medium and overlapping the same, stay-rods connecting said plates and lying in contact with said filtering medium, and pipe connections leading to, uniting, and leading from said chambers, whereby the liquid to be filtered will be passed successively through said chambers, substantially as set forth.

3. In a filter, the combination with a chamber containing a granular filtering medium, of a second and separate chamber, a porous-wall filtering device therein consisting of an interior and exterior perforated cylinder, an intermediate filling of porous filtering material, upper and lower imperforate plates lying on and closing the ends of said cylinders and overlapping the exterior one thereof, and stay-rods connecting said plates and lying in contact with said outer cylinder, and pipe connections leading to, uniting, and leading from said chambers, whereby the liquid to be filtered will be passed successively through said chambers, substantially as set forth.

4. A strainer for a filtering system, consisting of a cylinder having a plurality of kerfs or slots in its area for the passage of the liquid, imperforate plates closing the ends of said cylinders and overlapping the same, and stay-rods connecting said plates exterior to said cylinder for detachably retaining the parts together, substantially as set forth.

In testimony whereof I have hereunto set my hand in the presence of two subscribing witnesses.

THOMAS HOWARD.

Witnesses:
MIKE MURPHY,
PAUL POAGE.